(12) United States Patent
Maruoka

(10) Patent No.: US 12,736,812 B2
(45) Date of Patent: Sep. 15, 2026

(54) HEAD-UP DISPLAY DEVICE

(71) Applicant: Nippon Seiki Co., Ltd., Niigata (JP)

(72) Inventor: Hisatoshi Maruoka, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 227 days.

(21) Appl. No.: 18/713,790

(22) PCT Filed: Nov. 28, 2022

(86) PCT No.: PCT/JP2022/043696
§ 371 (c)(1),
(2) Date: May 28, 2024

(87) PCT Pub. No.: WO2023/100785
PCT Pub. Date: Jun. 8, 2023

(65) Prior Publication Data

US 2025/0020924 A1 Jan. 16, 2025

(30) Foreign Application Priority Data

Nov. 30, 2021 (JP) ................................ 2021-194333

(51) Int. Cl.
*G02B 27/01* (2006.01)
*B60K 35/22* (2024.01)
(Continued)

(52) U.S. Cl.
CPC .......... *G02B 27/0149* (2013.01); *B60K 35/22* (2024.01); *B60K 35/232* (2024.01);
(Continued)

(58) Field of Classification Search
CPC ............ G02B 27/0149; G02B 27/0101; G02B 2027/011; G02B 2027/015;
(Continued)

(56) References Cited

U.S. PATENT DOCUMENTS

2017/0169612 A1 6/2017 Cashen et al.
2019/0011712 A1 1/2019 Nagano et al.

FOREIGN PATENT DOCUMENTS

JP 6693474 B2 5/2020
JP 2021105647 A * 7/2021
WO 2017/138242 A1 8/2017

OTHER PUBLICATIONS

International Search Report dated Feb. 7, 2023 issued in International Patent Application No. PCT/JP2022/043696, with English translation.

* cited by examiner

*Primary Examiner* — William Choi
(74) *Attorney, Agent, or Firm* — Rimon P.C.

(57) ABSTRACT

The purpose of the present invention is to provide a head-up display device that enables a reduction in size. A head-up display device according to the present invention displays a virtual image by projecting display light onto a windshield. The head-up display device comprises: A display unit that radiates the display light; a second mirror having a reflective surface that reflects the display light toward the windshield; and a drive mechanism that rotates the second mirror among a plurality of rotation positions centered on an axis of rotation (Ax) such that the irradiation position of the display light on the windshield changes in the height direction. When the second mirror is at each rotation position, display light reflection regions for reflecting the display light on the reflective surface are set to be substantially the same.

3 Claims, 10 Drawing Sheets

(51) Int. Cl.

| | |
|---|---|
| ***B60K 35/232*** | (2024.01) |
| ***B60K 35/50*** | (2024.01) |
| ***B60K 35/60*** | (2024.01) |
| ***B60K 35/80*** | (2024.01) |
| *B60K 35/23* | (2024.01) |
| *B60K 35/90* | (2024.01) |
| *B60K 37/00* | (2006.01) |

(52) U.S. Cl.
CPC .............. *B60K 35/50* (2024.01); *B60K 35/60* (2024.01); *B60K 35/80* (2024.01); *G02B 27/0101* (2013.01); *B60K 35/23* (2024.01); *B60K 35/90* (2024.01); *B60K 37/00* (2013.01); *B60K 2360/23* (2024.01); *G02B 2027/011* (2013.01); *G02B 2027/015* (2013.01); *G02B 2027/0154* (2013.01)

(58) Field of Classification Search
CPC .......... G02B 2027/0154; B60K 35/232; B60K 35/80; B60K 35/50; B60K 35/60; B60K 35/22; B60K 35/23; B60K 2360/23; B60K 35/90; B60K 37/00
USPC .......................................................... 359/630
See application file for complete search history.

HEAD-UP DISPLAY DEVICE

CROSS-REFERENCE OF RELATED APPLICATIONS

This application is the U.S. National Phase under 35 U.S.C. § 371 of International Patent Application No. PCT/JP2022/043696, filed on Nov. 28, 2022, which in turn claims the benefit of Japanese Patent Application No. 2021-194333, filed on Nov. 30, 2021, the entire disclosures of which Applications are incorporated by reference herein.

TECHNICAL FIELD

The present disclosure relates to a head-up display device.

BACKGROUND ART

For example, the head-up display device described in Patent Document 1 includes a projection unit that projects projection light representing an image, a reflective screen that diffusely reflects the projection light, a concave mirror that magnifies and reflects image light, which is the projection light diffusely reflected by the reflective screen, toward a projection member, and a concave mirror motor that rotates the concave mirror.

PRIOR ART DOCUMENT

Patent Document

Patent Document 1: Japanese Patent No. 6693474

SUMMARY OF THE INVENTION

Problems to be Solved by the Invention

In the configuration described in the above Patent Document 1, as the concave mirror rotates, a light reflection area, which is a used area on the reflective surface of the concave mirror, moves. The size of the reflective surface is set such that the reflective surface includes the entire light reflection area that moves as the concave mirror rotates. This makes the concave mirror and, consequently, the heads-up display device larger.

The present disclosure has been made in view of the above circumstances, and an object of the present disclosure is to provide a head-up display device that can be made smaller.

Solution to Problem

In order to achieve the above object, a head-up display device according to a first aspect of the present disclosure displays a virtual image by projecting display light onto a projected member. The head-up display device includes a display unit that emits the display light, a mirror including a reflective surface that reflects the display light toward the projected member, and a drive mechanism that rotates the mirror between a plurality of rotation positions around a rotation axis so as to change an irradiation position of the display light on the projected member. In the head-up display device, when the mirror is in each of the rotation positions, display light reflection areas reflecting the display light on the reflective surface are set so as to substantially coincide with each other.

In order to achieve the above object, the head-up display device according to a second aspect of the present disclosure displays a virtual image in a virtual image display area by projecting display light onto a projected member. The head-up display device includes a display unit that emits the display light, a mirror including a reflective surface that reflects the display light toward the projected member, and a drive mechanism that rotates the mirror between a plurality of rotation positions around a rotation axis so as to change an irradiation position of the display light on the projected member. In the head-up display device, a light ray, of the display light, corresponding to a center position of the virtual image display area passes through display image center positions within display light reflection areas that reflect the display light on the reflective surface. When the mirror is in each of the rotation positions, a deviation amount of the display light reflection areas is set to be smaller than a positional deviation amount of the display image center positions.

Effect of the Invention

According to the present disclosure, it is possible to downsize the head-up display device.

BRIEF DESCRIPTION OF THE DRAWINGS

FIG. 1 is a schematic diagram of an automobile according to one embodiment of the present disclosure.

FIG. 3 is a schematic diagram of the head-up display device according to the one embodiment of the present disclosure when the second mirror is at a low viewpoint rotation angle.

FIG. 4 is a schematic diagram of the head-up display device according to the one embodiment of the present disclosure when the second mirror is at a high viewpoint rotation angle.

MODE FOR CARRYING OUT THE INVENTION

Figure 2:
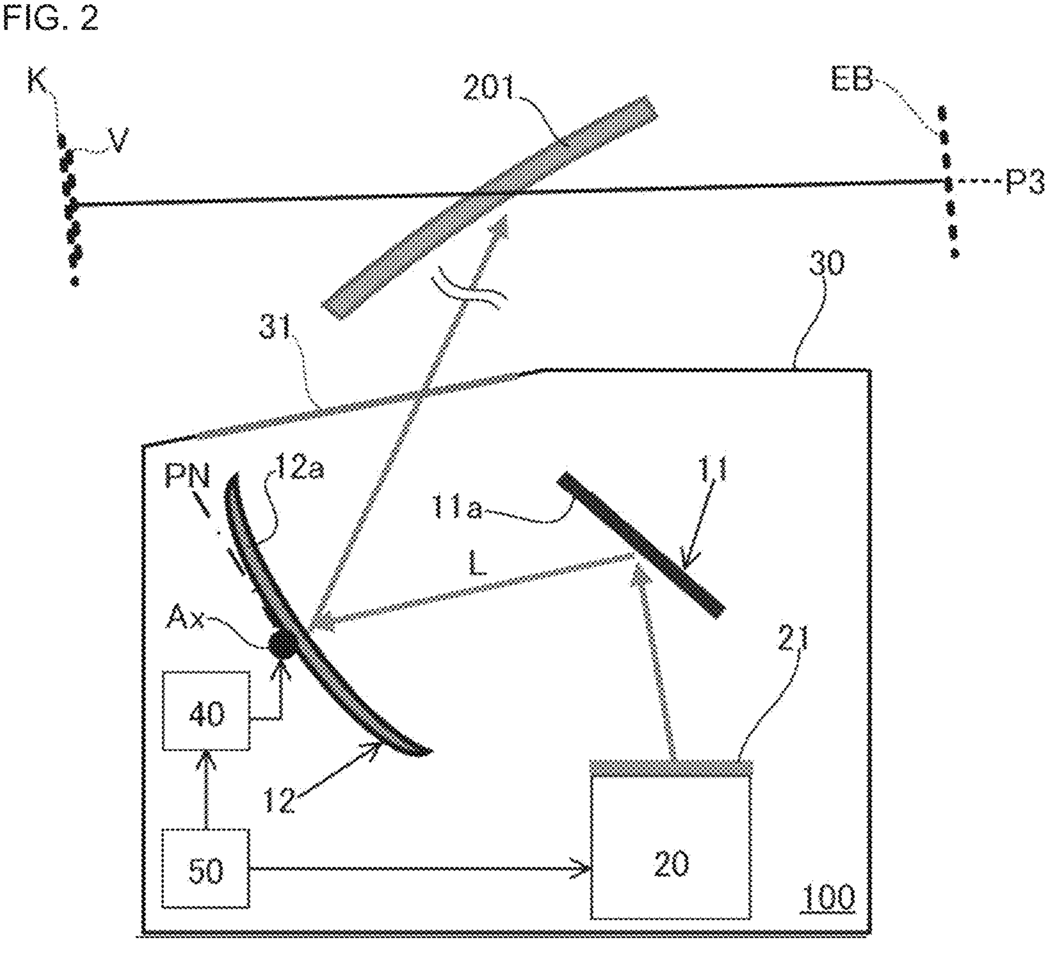
FIG. 2 is a schematic diagram of a head-up display device according to the one embodiment of the present disclosure when a second mirror is at a middle viewpoint rotation angle.

One embodiment of a head-up display device according to the present disclosure is described with reference to the drawings.

Figure 1:
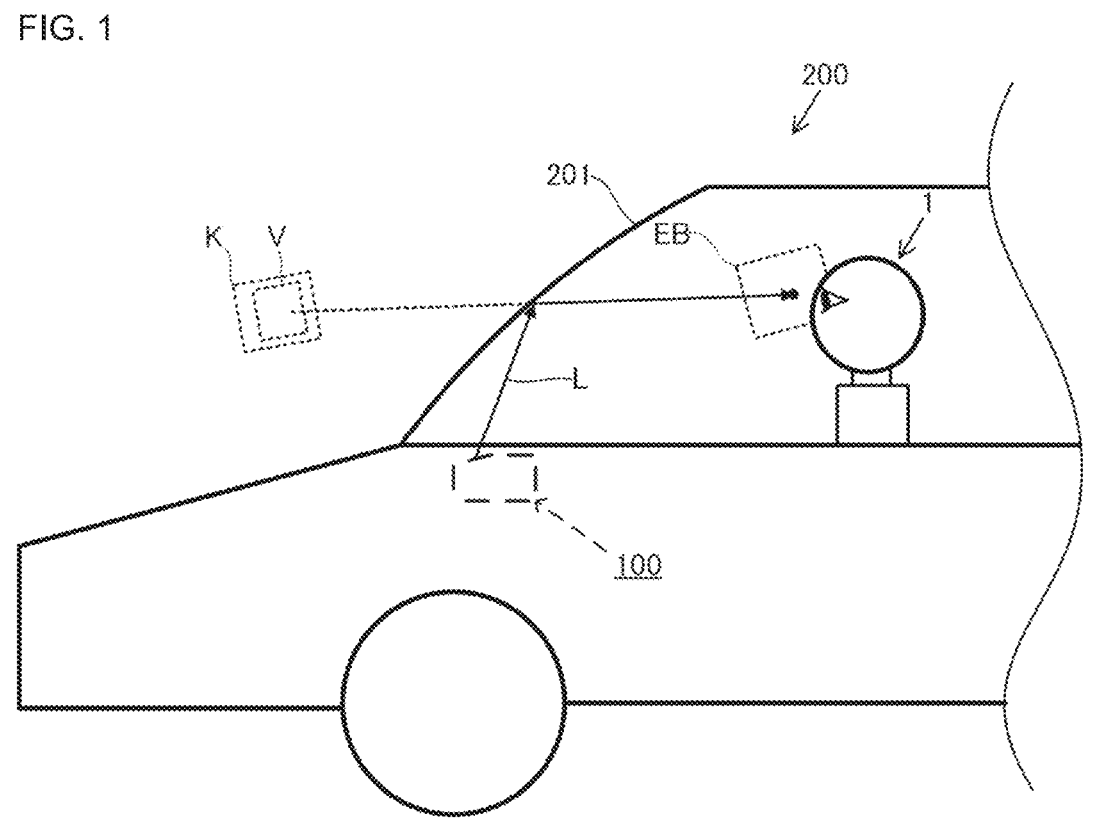

As illustrated in FIG. 1, a head-up display device 100 is installed in a dashboard of an automobile 200. The head-up display device 100 projects display light L onto a windshield 201, which is a projected member. As a result, a virtual image V including automobile information is displayed so as to be visible to a viewer 1 (e.g., a driver of the automobile 200) whose viewpoint is located within an eye box EB. The virtual image V is displayed in a virtual image display area K located virtually outside the automobile. The windshield 201 is curved so as to bulge toward the outside of the automobile, and the height of the windshield 201 decreases toward the front of the automobile 200.

As illustrated in FIG. 2, the head-up display device 100 includes a first mirror 11, a second mirror 12, a display unit 20, a case 30, a drive mechanism 40, and a control portion 50. The case 30 is made of a light-shielding resin or metal and formed in a box shape. The first mirror 11, the second mirror 12, and the display unit 20 are housed within the case 30. The case 30 is provided with a window portion 31 made of a light-transmitting member that transmits the display light L generated in an inner space of the case 30 toward the windshield 201.

The display unit 20 includes a light emitting surface 21 that emits the display light L representing an image. The display unit 20 may be of a type including a liquid crystal panel and a lighting device or may be of a type including a reflective display element such as a digital micromirror device (DMD) element. An image displayed on the light emitting surface 21 is subjected to distortion correction to correct distortion of the virtual image viewed by the viewer 1.

As illustrated in FIG. 2, the first mirror 11 reflects the display light L emitted from the display unit 20 toward the second mirror 12. The first mirror 11 is a plane mirror.

Note that the first mirror 11 is not limited to a plane mirror, and the first mirror 11 may be a concave mirror. A reflective surface 11*a* of the first mirror 11 faces a front and lower side of the automobile.

As illustrated in FIG. 2, the second mirror 12 is a concave mirror that curves along the height direction and the width direction of the automobile. The second mirror 12 reflects the display light L reflected from the first mirror 11 toward the windshield 201. A reflective surface 12*a*, which forms a concave curved surface of the second mirror 12, faces toward a rear and upper side of the automobile. The length of the reflective surface 12*a* in the vertical direction (height direction) is set to approximately 80 mm, for example, 80.2 mm. The second mirror 12 has a function of preventing distortion of the virtual image due to reflection on the windshield 201 in cooperation with the first mirror 11.

The second mirror 12 is supported within the case 30 so as to be rotatable around a rotation axis Ax extending along the width direction of the automobile 200.

The drive mechanism 40 rotates the second mirror 12 around the rotation axis Ax under the control of the control portion 50 so as to change the irradiation height of the display light L on the windshield 201. The drive mechanism 40 includes a motor (not shown) and a conversion mechanism (not shown) that converts a rotational motion of the motor into a linear motion. This conversion mechanism rotates the second mirror 12 around the rotation axis Ax by transmitting the converted linear motion to the second mirror 12.

Figure 3:
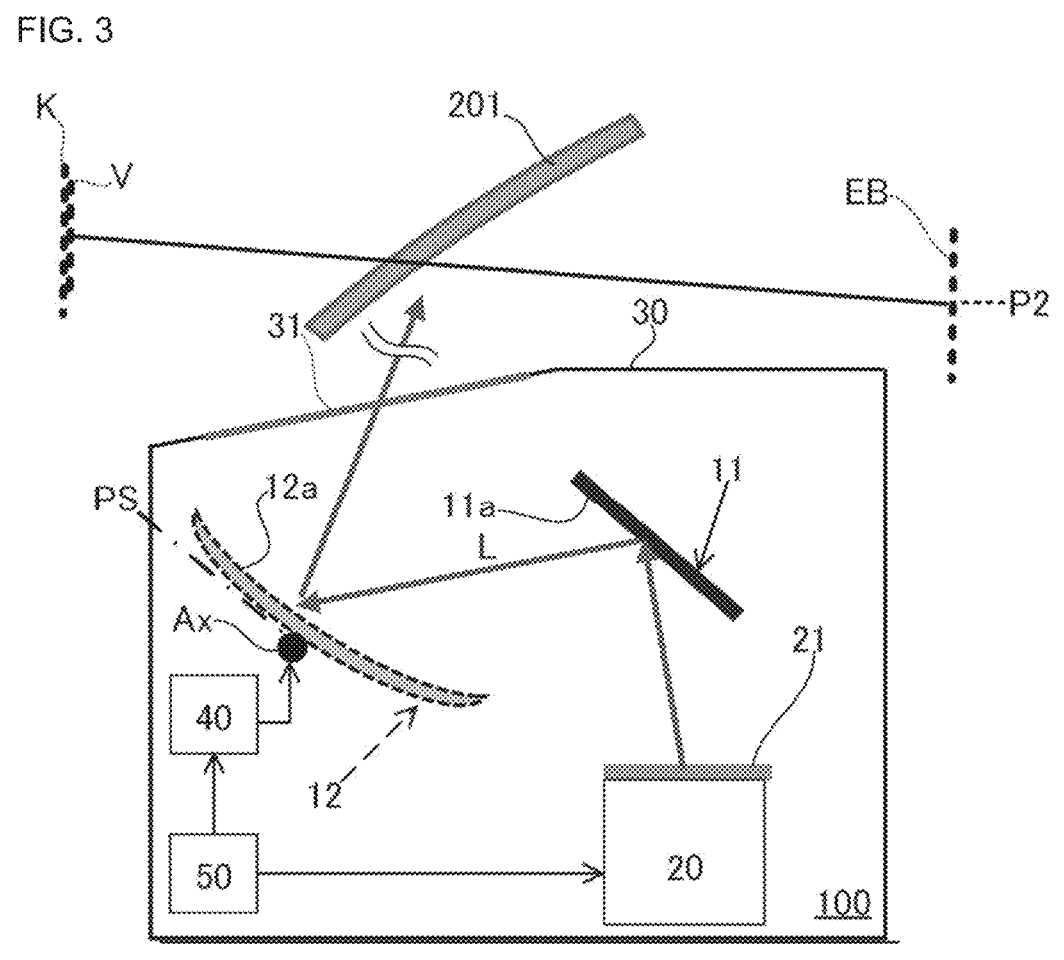
Figure 4:
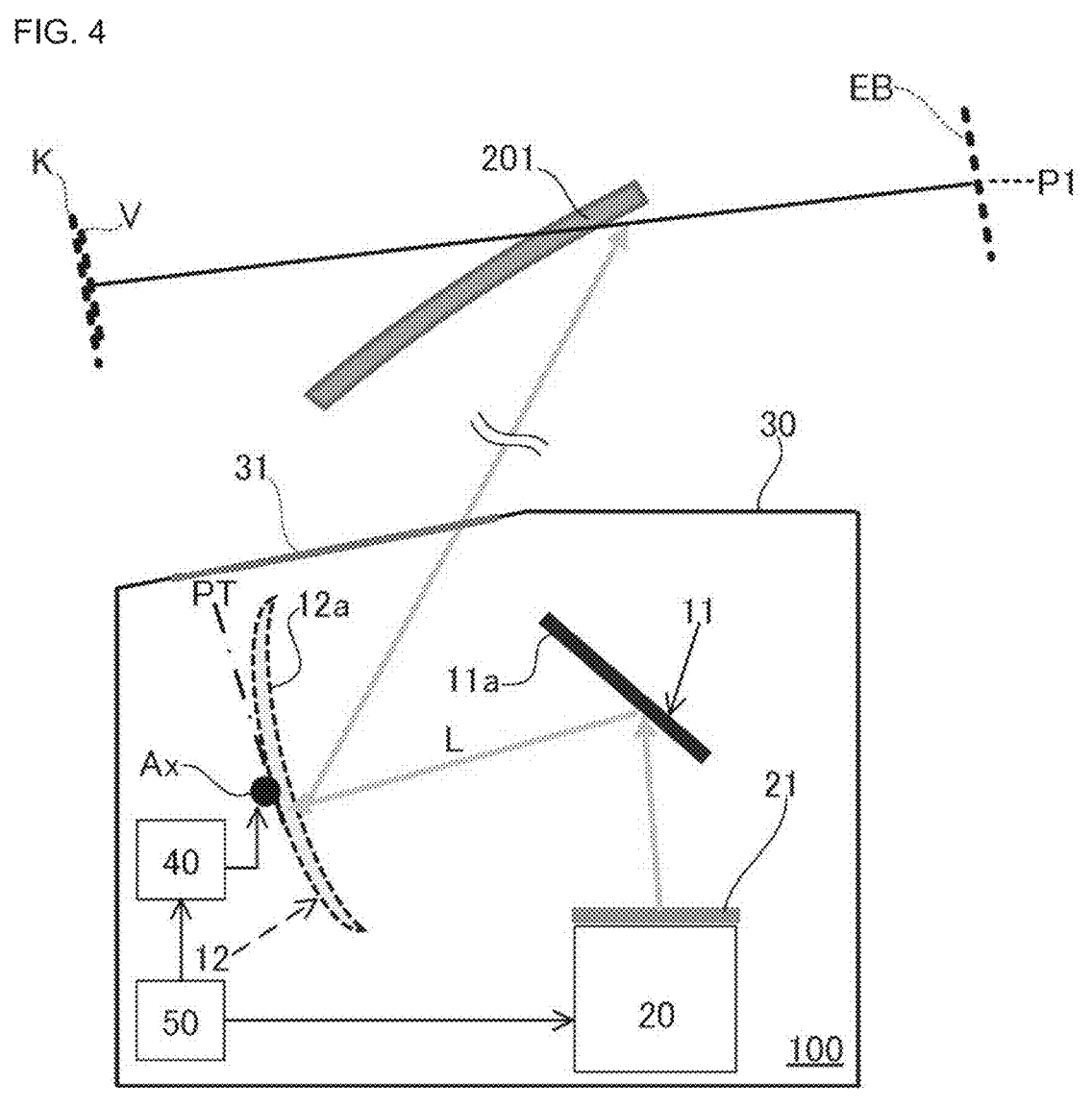

The second mirror 12 is set by the drive mechanism 40 to one of rotation angles of a high viewpoint rotation position PT (see FIG. 4), a middle viewpoint rotation position PN (see FIG. 2), and a low viewpoint rotation position PS (see FIG. 3).

When the second mirror 12 is in the high viewpoint rotation position PT (see FIG. 4), the reflective surface 12*a* faces toward the rear of the automobile. When the second mirror 12 is in the low viewpoint rotation position PS (see FIG. 3), the reflective surface 12*a* faces toward the upper side of the automobile. The middle viewpoint rotation position PN (see FIG. 2) is set to an intermediate angle between the high viewpoint rotation position PT (see FIG. 4) and the low viewpoint rotation position PS (see FIG. 3).

When the second mirror 12 is in the high viewpoint rotation position PT (see FIG. 4), the display light L is radiated at a higher position of the windshield 201 compared to when the second mirror 12 is in the middle viewpoint rotation position PN (see FIG. 2) or the low viewpoint rotation position PS (see FIG. 3). As a result, the eye box EB is set to a high position P1.

When the second mirror 12 is in the low viewpoint rotation position PS, the display light L is radiated at a lower position of the windshield 201 compared to when the second mirror 12 is in the middle viewpoint rotation position PN or the high viewpoint rotation position PT. As a result, the eye box EB is set to a low position P2. Further, when the second mirror 12 is in the middle viewpoint rotation position PN, the eye box EB is set to a middle position P3 between the high position P1 and the low position P2.

The control portion 50 is configured by, for example, a microcomputer, and controls the drive mechanism 40 and the display unit 20 based on information from an automobile-mounted electronic control unit (ECU) not shown. Based on an operation of a switch (not shown) by the viewer 1 or a detection portion (not shown) that detects a viewpoint position of the viewer 1, the control portion 50 sets the second mirror 12 to one of the rotation angles (rotation positions) of the high viewpoint rotation position PT, the middle viewpoint rotation position PN, and the low viewpoint rotation position PS.

Figure 7:
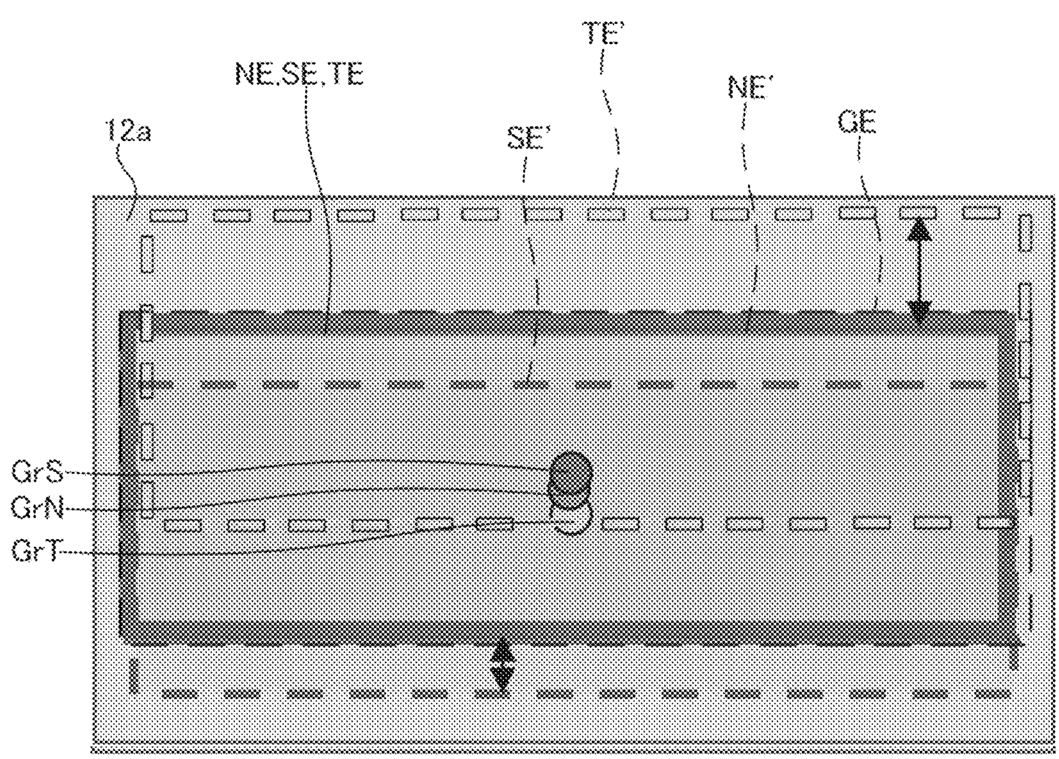
FIG. 7 is a schematic diagram illustrating the display light reflection areas and the display image center positions according to the one embodiment and the comparative example of the present disclosure.
Figure 8:
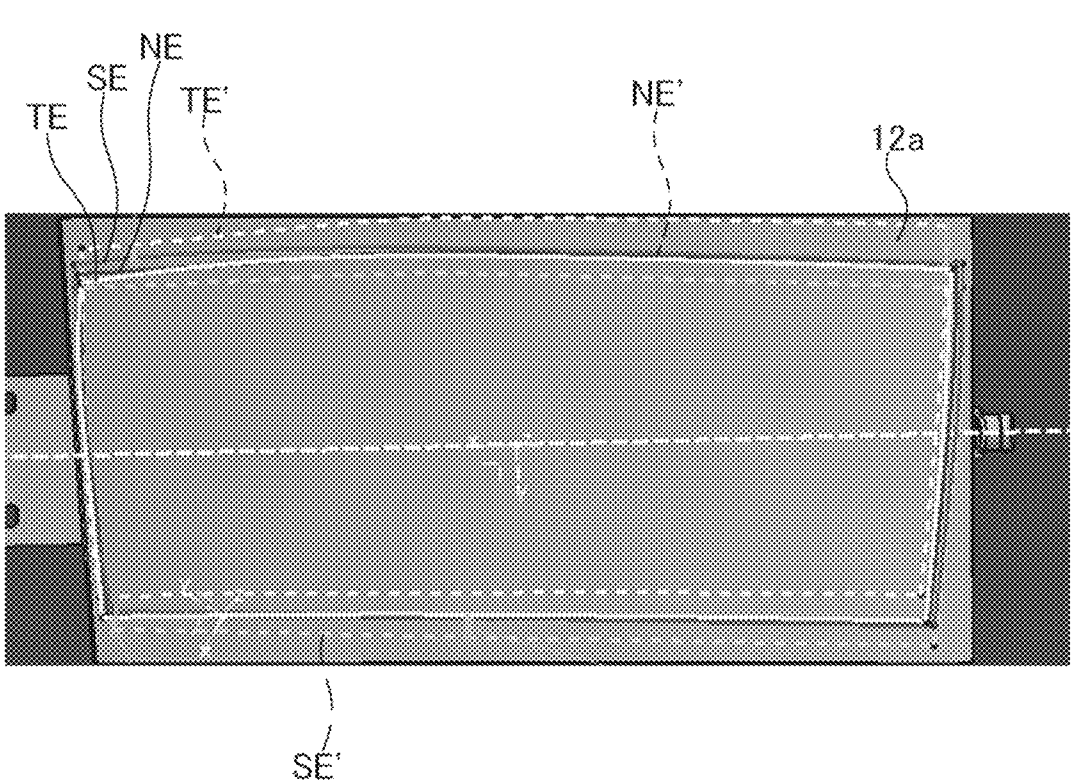
FIG. 8 is a diagram illustrating the display light reflection areas and the display image center positions according to the one embodiment and the comparative example of the present disclosure.

Next, referring to FIG. 7 and FIG. 8, display light reflection areas NE, SE, TE and display image center positions GrN, GrS, and GrT corresponding to the rotation positions PT, PN, PS, set on the reflective surface 12*a*, are described.

The display light reflection areas NE, SE, and TE are used areas of the reflective surface 12*a* which are irradiated with the display light. The display light reflection area NE is an area when the second mirror 12 is in the middle viewpoint rotation position PN (see FIG. 2). The display light reflection area SE is an area when the second mirror 12 is in the low viewpoint rotation position PS (see FIG. 3). The display light reflection area TE is an area when the second mirror 12 is in the high viewpoint rotation position PT (see FIG. 4).

In the present embodiment, the display light reflection areas NE, SE, and TE of the rotation positions PT, PN, and PS are set so as to substantially coincide with each other.

The display image center positions GrN, GrS, and GrT are positions of the reflective surface 12*a* reached by tracing a light ray of the display light L corresponding to the center position of the virtual image display area K (see FIG. 2). The display image center positions GrN, GrS, and GrT do not necessarily coincide with the area center positions of the display light reflection areas NE, SE, and TE due to various reasons. Examples of these various reasons include the fact that the image displayed on the light emitting surface 21 is corrected for distortion and the fact that a distance to the windshield 201 varies depending on the position of the reflective surface 12*a* due to the inclination of the reflective surface 12*a*. The display image center position GrN is located within the display light reflection area NE when the second mirror 12 is in the middle viewpoint rotation position PN. The display image center position GrS is located within the display light reflection area SE when the second mirror 12 is in the low viewpoint rotation position PS, and is shifted upward from the display image center position GrN. The display image center position GrT is located within the display light reflection area TE when the second mirror 12 is in the high viewpoint rotation position PT, and is shifted downward from the display image center position GrN.

Figure 6:
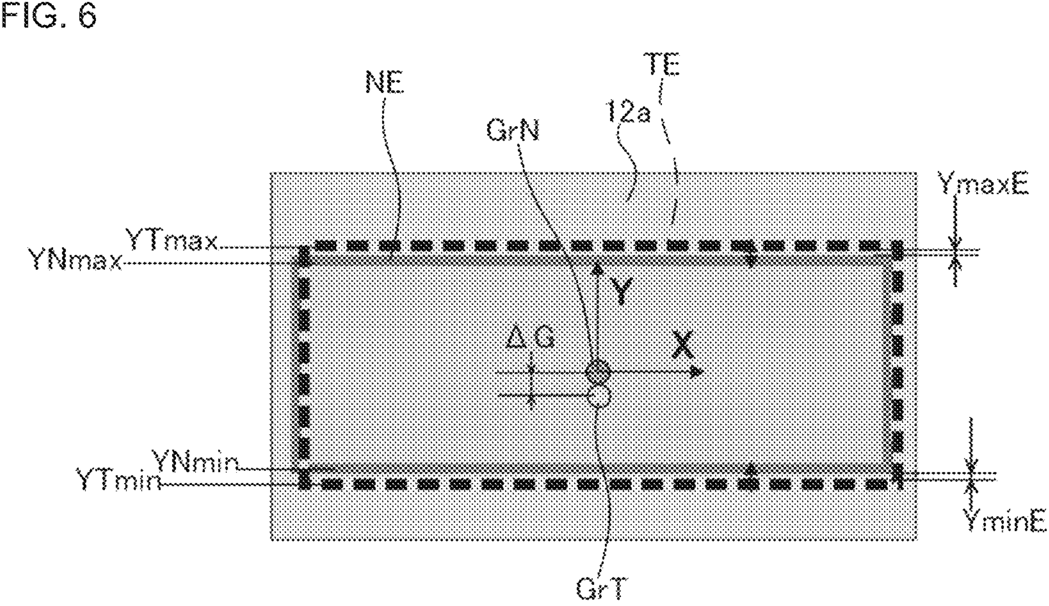
FIG. 6 is a schematic diagram of the display light reflection areas and the display image center positions according to the one embodiment of the present disclosure.

As illustrated in FIG. 6, in the present embodiment, a distance ΔG in a Y direction between the two display image center positions GrN and GrT is set to be larger than deviation amounts YmaxE and YminE in the Y direction of the two display light reflection areas NE and TE. Further, as illustrated in FIG. 7, a distance in the Y direction between the two display image center positions GrN and GrS is set to be larger than deviation amounts in the Y direction of the two display light reflection areas NE and SE.

An X direction is along the long side direction of the reflective surface 12*a* and the width direction of the automobile, and the Y direction is along the short side direction of the reflective surface 12*a* and the height direction of the automobile. The origin of the XY coordinate is located at the center of the reflective surface 12*a*.

The deviation amount YmaxE is obtained by subtracting the maximum value YNmax located at the upper end of the display light reflection area NE from the maximum value YTmax located at the upper end of the display light reflection area TE. The deviation amount YminE is obtained by subtracting the maximum value YNmin located at the bottom end of the display light reflection area NE from the maximum value YTmin located at the bottom end of the display light reflection area TE. In this coordinate, the center of the display light reflection area NE in the Y direction is set as the origin, and a value upward from the origin is a positive value, and a value downward from the origin is a negative value. In this case, it is preferable that the sum of the deviation amount YmaxE and the deviation amount YminE is set so that the following equation is satisfied.

$-0.5\text{ mm} < YmaxE + YminE < 0.5\text{ mm}$ As in the example in FIG. 6, when the length of the display light reflection area TE in the Y direction is longer than the length of the display light reflection area NE in the Y direction, and the display light reflection area NE is located so as to be included in the display light reflection area TE in the Y direction, the deviation amount YmaxE takes a positive value, and the deviation amount YminE takes a negative value.

Thus, if the absolute values of these values have the same value, "YmaxE+YminE" becomes zero, and the above equation is satisfied.

Next, a method for setting the display light reflection areas NE, SE, and TE and the display image center positions GrN, GrS, and GrT is described in comparison with a comparative example.

Figure 5:
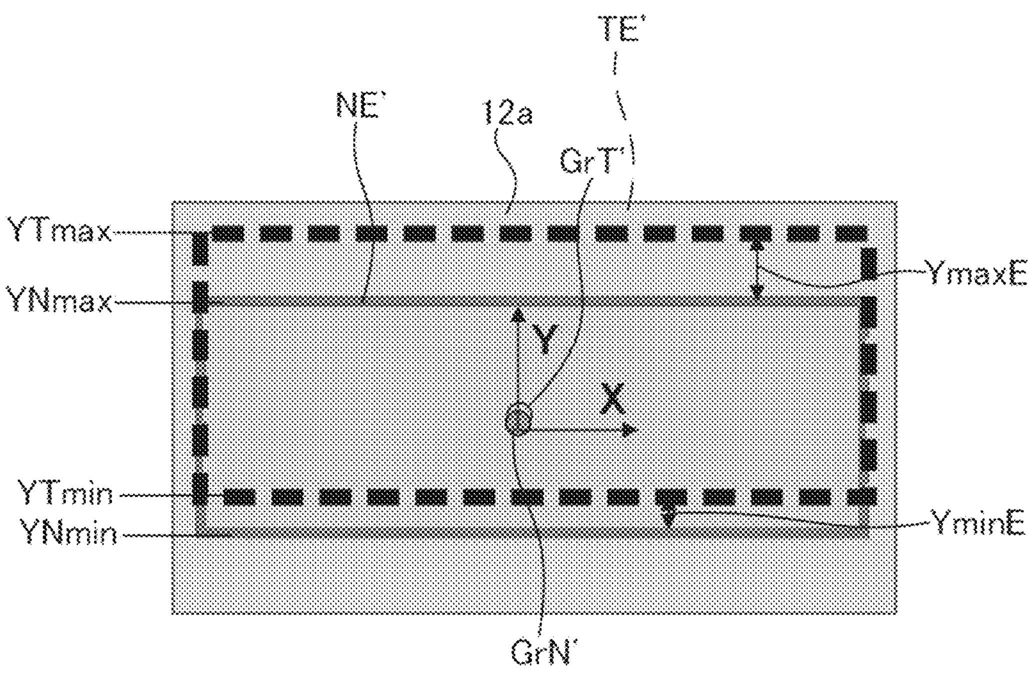
FIG. 5 is a schematic diagram of display light reflection areas and display image center positions according to a comparative example.
Figure 9:
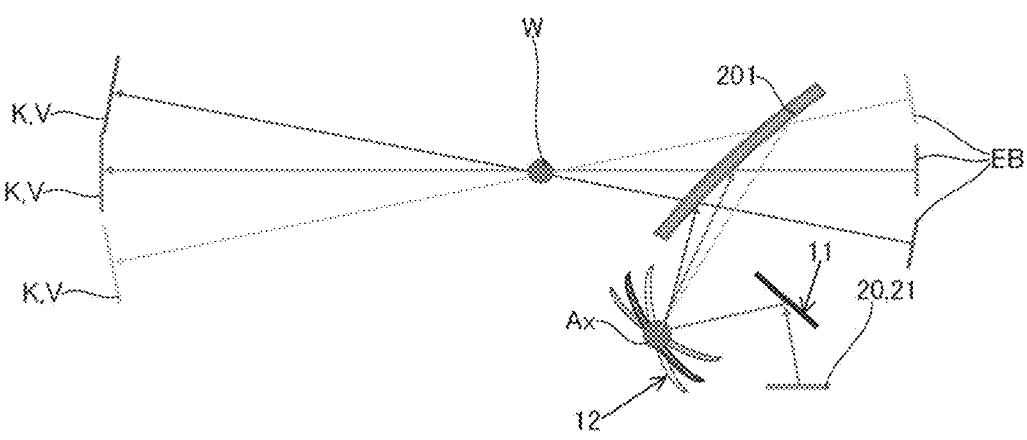
FIG. 9 is a schematic diagram illustrating an optical path of the head-up display device according to the comparative example.
Figure 10:
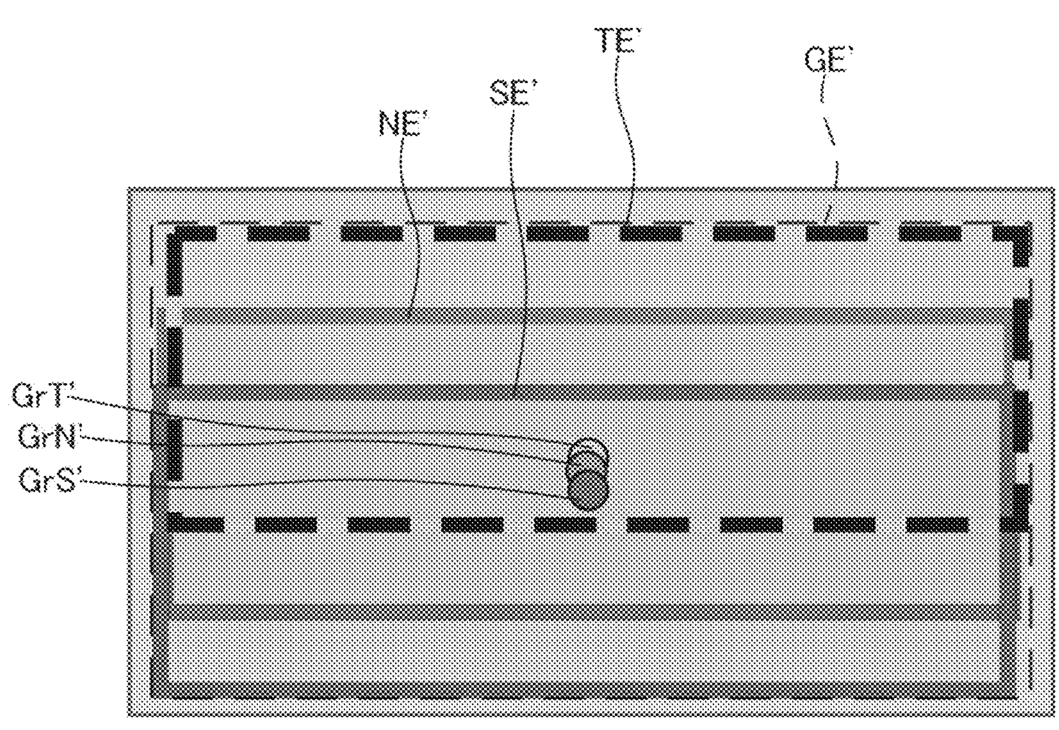
FIG. 10 is a schematic diagram illustrating the display light reflection areas and the display image center positions according to the comparative example.

In the comparative example, as illustrated in FIG. 9, regardless of the rotation position of the second mirror 12 around the rotation axis Ax, a line segment connecting the center position of the eye box EB and the center position of the virtual image display area K is designed to pass through an intersection point W. As a result, as illustrated in FIG. 5 and FIG. 10, in the comparative example, display image center positions GrN', GrS', and GrT' substantially coincide with each other on the reflective surface 12*a*. In other words, the rotation angles of the second mirror 12 for the rotation positions PT, PN, and PS are set so that the display image center positions GrN', GrS', and GrT' substantially coincide with each other on the reflective surface 12*a*. This substantial coincidence is set within a range that includes positional deviations of the display image center positions GrN', GrS', and GrT' due to the shape of the windshield 201 or the like. When the display image center positions GrN', GrS', and GrT' are set in this manner, positional deviation amounts of display light reflection areas NE', SE', and TE' increases due to the rotation of the second mirror 12 between the rotation positions PT, PN, and PS. As a result, in the comparative example, as illustrated in FIG. 10, the size of a combined area GE', which is a combination of the positionally deviated display light reflection areas NE', SE', and TE', increases, thereby increasing the size of the reflective surface 12*a*.

On the other hand, in the present embodiment, as illustrated in FIG. 7, the rotation angle of the second mirror 12 is set by allowing the positional deviations of the display image center positions GrN, GrS, and GrT so that the display light reflection areas NE, SE, and TE substantially coincide with each other, in other words, a combined area GE obtained by combining the display light reflection areas NE, SE, and TE becomes small.

The following describes a method for setting the rotation angle of the second mirror 12 such that the display light reflection areas NE, SE, and TE substantially coincide with each other. This setting method is performed, for example, using a simulation result executed by a processing portion that is a computer different from the head-up display device 100.

The processing portion searches for the rotation angle of the second mirror 12 that satisfies the following conditional equation while rotating the second mirror 12 in the simulation. $YmaxE+YminE=0$ In the above conditional equation, the deviation amounts YmaxE and YminE (see FIG. 6) of the display light reflection areas SE and TE with respect to the display light reflection area NE as a reference are calculated by the following equation.

$$YmaxE = YTmax - YNmax,\ YminE = YTmin - YNmin$$

Hereinafter, in this setting method, a method for setting the display light reflection area TE such that it coincides with the display light reflection area NE is specifically described. The processing portion first obtains the maximum value YNmax and the minimum value YNmin of the display light reflection area NE when the second mirror 12 is in the middle viewpoint rotation position PN. In this example, the display light reflection area NE serves as a reference.

Then, the processing portion rotates the second mirror 12 from an initial value of the high viewpoint rotation position PT in either a positive or negative direction within a permissible range to calculate the maximum value YTmax and the minimum value YTmin of the display light reflection area TE, thereby finding the rotation angle of the second mirror 12 that satisfies the above conditional equation. This permissible range is set to an angular range permissible for the high viewpoint rotation position PT. When the processing portion finds the rotation angle of the second mirror 12 that satisfies the above conditional equation, the processing portion sets this rotation angle as the high viewpoint rotation position PT. This completes the setting of the display light reflection area TE.

Note that if the processing portion cannot find the rotation angle of the second mirror 12 that satisfies the above conditional equation within the above permissible range, the processing portion may set the rotation angle of the second mirror 12 in a range where "YmaxE+YminE" is greater than-0.5 mm and smaller than 0.5 mm as the high viewpoint rotation position PT.

By satisfying the above conditional equation, as illustrated in FIG. 6, the absolute values of the deviation amounts YmaxE and YminE become equal, and the display light reflection areas NE and TE become symmetrical in the height direction (Y direction). Further, although the display image center positions GrN and GrT of the display light reflection areas NE and TE are shifted from each other in the height direction, the center positions of the display light reflection areas NE and TE substantially coincide with each other. In this example, the distance ΔG between the display image center positions GrN and GrT of the display light reflection areas NE and TE is set to be larger than the deviation amounts YmaxE and YminE.

After setting the display light reflection area TE, the processing portion sets the display light reflection area SE such that it coincides with the display light reflection area NE in the same manner as the display light reflection area TE. That is, the processing portion rotates the second mirror 12 to find the low viewpoint rotation position PS that satisfies the above conditional equation, thereby setting the low viewpoint rotation position PS. This completes the setting of each of the rotation positions PT, PN, and PS and each of the display light reflection areas NE, SE, and TE.

Note that although the above setting method is performed through simulation, the setting method is not limited to this, and may be performed through experiment.

In the comparative example, as illustrated in FIG. 10, the display light reflection areas NE', SE', and TE' are shifted from each other in the height direction. Thus, the combined area GE' of the display light reflection areas NE', SE', and TE' becomes large. On the other hand, in the present embodiment, as illustrated in FIG. 7, the display light reflection areas NE, SE, and TE have small deviations, and the combined area GE of the display light reflection areas NE, SE, and TE becomes small. Thus, in the present embodiment, an area other than the combined area GE of the display light reflection areas NE, SE, and TE can be omitted, making it possible to downsize the second mirror 12.

Note that, FIGS. 5 to 7 and FIG. 10 schematically illustrate the display light reflection areas NE, SE, TE, NE', SE', and TE', while FIG. 8 schematically illustrates the display light reflection areas NE, SE, TE, NE', SE', and TE' in more detail.

(Effects)

According to the one embodiment described above, the following effects are exhibited.

(1) The head-up display device 100 displays the virtual image V by projecting the display light L onto the windshield 201, which is an example of the projected member. The head-up display device 100 includes the display unit 20 that emits the display light L, the second mirror 12 that is an example of a mirror including the reflective surface 12*a* that reflects the display light L toward the windshield 201, and the drive mechanism 40 that rotates the second mirror 12 between the plurality of rotation positions (the high viewpoint rotation position PT, the middle viewpoint rotation position PN, and the low viewpoint rotation position PS) around the rotation axis Ax so as to change the irradiation position of the display light L on the windshield 201 in the height direction. When the second mirror 12 is in each of the rotation positions PT, PN, and PS, the display light reflection areas NE, SE, and TE that reflect the display light L on the reflective surface 12*a* are set to substantially coincide with each other.

According to this configuration, the size of the reflective surface 12*a* can be smaller. This makes it possible to downsize the second mirror 12 and, consequently, the head-up display device 100.

(2) The head-up display device 100 displays the virtual image V in the virtual image display area K by projecting the display light L onto the windshield 201. The head-up display device 100 includes the display unit 20 that emits the display light L, the second mirror 12 including the reflective surface 12*a* that reflects the display light L toward the windshield 201, and the drive mechanism 40 that rotates the second mirror 12 between the plurality of rotation positions (the high viewpoint rotation position PT, the middle viewpoint rotation position PN, and the low viewpoint rotation position PS) around the rotation axis Ax so as to change the irradiation position of the display light L on the windshield 201 in the height direction. The light ray (Gutray) of the display light L corresponding to the center position of the virtual image display area K passes through the display image center positions GrN, GrS, and GrT in the display light reflection areas NE, SE, and TE that reflect the display light L on the reflective surface 12*a*. When the second mirror 12 is in each of the rotation positions PT, PN, PS, the deviation amounts YmaxE and YminE of the display light reflection areas NE, SE, and TE are set to be smaller than the deviation amount (distance ΔG) of the display image center positions GrN, GrS, and GrT.

According to this configuration, the size of the reflective surface 12*a* can be smaller. This makes it possible to downsize the second mirror 12 and, consequently, the head-up display device 100.

(3) When the second mirror 12 is in the middle viewpoint rotation position PN, which is an example of a first rotation position, the positions of both ends from the origin located at the center of the display light reflection area NE in the height direction (Y direction) are defined as the maximum value YNmax, which is an example of a first maximum value, and the minimum value YNmin, which is an example of a first minimum value. When the second mirror 12 is in the high viewpoint rotation position PT, which is an example of a second rotation position, the positions of both ends from the origin of the display light reflection area TE in the height direction are defined as the maximum value YTmax, which is an example of a second maximum value, and the minimum value YTmin, which is an example of a second minimum value. Under such conditions, a value obtained by adding the deviation amount YmaxE, which is an example of a first deviation amount obtained by subtracting the maximum value YNmax from the maximum value YTmax, and the deviation amount YminE, which is an example of a second deviation amount obtained by subtracting the minimum value YNmin from the minimum value YTmin, is set to a range larger than-0.5 mm and smaller than 0.5 mm.

According to this configuration, the display light reflection areas NE and TE can be made symmetrical in the height direction (Y direction), and the second mirror 12 and, consequently, the head-up display device 100 can be made smaller.

Note that the present disclosure is not limited to the above embodiment and drawings. It is possible to make a modification (including deletion of constituent elements) as appropriate without changing the gist of the present disclosure. The following describes an exemplary modification.

(Modifications)

In the above embodiment, the distance ΔG between the display image center positions GrN and GrT of the display light reflection areas NE and TE is set to be larger than the deviation amounts YmaxE and YminE. However, the present disclosure is not limited to this, and the distance ΔG may be set to be smaller than the deviation amounts YmaxE and YminE.

The first mirror 11 in the above embodiment may be omitted. In this case, the display light L from the display unit 20 is directly projected onto the reflective surface 12*a* of the second mirror 12.

In the above embodiment, "YmaxE+YminE" is set within the range greater than-0.5 mm and smaller than 0.5 mm. However, "YmaxE+YminE" may be outside this range.

In the above embodiment, the display light reflection areas TE and SE are set using the display light reflection area NE as a reference. However, the present disclosure is not limited to this, and either of the display light reflection areas TE and SE may be used as a reference.

In the above embodiment, the head-up display device 100 is mounted in the automobile. However, the present disclosure is not limited to this. The head-up display device 100 may be mounted on a vehicle such as an airplane or a ship. Further, the projected member is not limited to the windshield 201, and the projected member may be a dedicated combiner.

DESCRIPTION OF REFERENCE NUMERALS

1: Viewer
11: First mirror
11*a*, 12*a*: Reflective surface
12: Second mirror
20: Display unit
21: Light emitting surface
30: Case
31: Window portion
40: Drive mechanism
50: Control portion
100: Head-up display device
200: Automobile
201: Windshield
K: Virtual image display area
L: Display light
EB: Eye box
P1: High position
P2: Low position
P3: Middle position
GE', GE: Combined area
V: Virtual image
W: Intersection point
NE, NE', SE, SE', TE, TE': Display light reflection area
PN: Middle viewpoint rotation position
PS: Low viewpoint rotation position
PT: High viewpoint rotation position
Ax: Rotation axis
GrN, GrN', GrS, GrS', GrT, GrT': Display image center position
YminE, YmaxE: Deviation amount

The invention claimed is:

1. A head-up display device that displays a virtual image within a virtual image display area by projecting display light onto a projected member, comprising:

a display unit that emits the display light;

a mirror including a reflective surface that reflects the display light toward the projected member; and a drive mechanism that rotates the mirror between a plurality of rotation positions around a rotational axis so as to change an irradiation position of the display light on the projected member, wherein:

a light ray, of the display light, corresponding to a center position of the virtual image display area passes through display image center positions within display light reflection areas that reflect the display light on the reflective surface; and when the mirror is in each of the rotation positions, a deviation amount of the display light reflection areas is set to be smaller than a positional deviation amount of the display image center positions.

2. The head-up display device according to claim 1, wherein when the mirror is in a first rotation position among the plurality of rotation positions, positions of both ends in a height direction, of a first display light reflection area corresponding to the first rotation position, from an origin located at a center of the first display light reflection area are defined as a first maximum value and a first minimum value, when the mirror is in a second rotation position among the plurality of rotation positions, the positions of both ends in the height direction, of a second display light reflection area corresponding to the second rotation position, from the origin are defined as a second maximum value and a second minimum value, where a position above the origin has a positive value, and a position below the origin has a negative value, and a value obtained by adding a first deviation amount, which is obtained by subtracting the first maximum value from the second maximum value, and a second deviation amount, which is obtained by subtracting the first minimum value from the second minimum value, is set to a range greater than −0.5 mm and smaller than 0.5 mm.

3. The head-up display device according to claim 1, wherein, when the mirror is in each of the rotation positions, the display light reflection areas are set to substantially coincide with each other.

* * * * *